May 15, 1923.
J. ALLEN
1,455,468
AUTOMOBILE FENDER
Filed Aug. 28, 1922
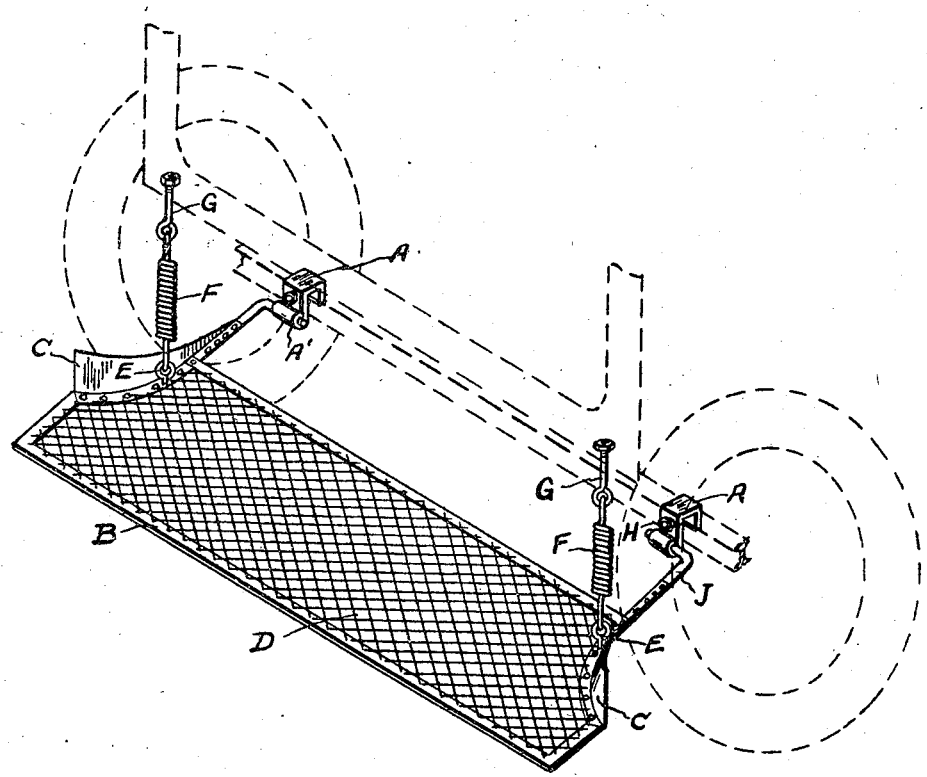
John Allen
INVENTOR
BY John C. Alexander
ATTORNEY

UNITED STATES PATENT OFFICE.

JOHN ALLEN, OF DETROIT, MICHIGAN.

AUTOMOBILE FENDER.

Application filed August 28, 1922. Serial No. 584,768.

*To all whom it may concern:*

Be it known that I, JOHN ALLEN, a subject of the King of Great Britain and Ireland, and residing at Detroit, county of Wayne, and State of Michigan, have invented a new and Improved Automobile Fender, of which the following is a specification.

This invention relates to automobile fenders, and has for its principal object the provision of a light weight fender arranged to lift and catch a person or animal that would otherwise be struck by the automobile.

Another object of my invention is to arrange a fender from the forward extremity of the car so as to contact a person or animal below its center of gravity, and provide a netting for holding the person or animal so struck to prevent the car from passing thereover.

A further object of the invention is the provision of an automobile fender of simple and inexpensive construction which will be efficient and durable in use and easily secured upon automobiles of various makes.

The above and other objects of my invention will be apparent from the following description wherein reference is made to the accompanying drawings illustrating a preferred embodiment of my invention.

In the drawing:—

The figure shows a perspective view of my improved automobile fender in position upon the front axle of a car.

Referring to the drawing the letter A designates a pair of channeled fulcrum brackets arranged to fit over the front axle of an automobile and said brackets are secured rigidly thereto by means of bolts or the like, at the requisite distances to pivotally support the side arms J of the frame B of the automobile fender. As herein shown the brackets A are formed with sleeves $A^1$ at their forward extremities, and the side arms J are formed with inturned ends arranged to pass through and fulcrum upon the sleeves $A^1$. The arms J are secured by bolts, or the like, to the rear extremities of the frame B of the fender, and may, of course, be turned so that their free ends point outwardly if necessary for ready positioning upon an automobile.

The fender is preferably made of a netting D laced through apertures in the frame B, substantially as shown herein, the netting being sufficiently taut to prevent sagging when a heavy object such as a man or a dog is supported thereon. The fender normally slants downwardly from the fulcrum brackets A to a position a few inches above the ground and is held in such position by supporting springs F arranged between eyebolts E and G on the frame and the radiator frame respectively, the bolts E being positioned upon the side arms of the frame B at the correct positions for the weight of the fender to place the springs F under tension and yet not permit the forward extremity of the fender to drag upon the ground. The side plates C are arranged to extend upwardly from the sides of the frame B in position to prevent the rolling of an object upon the fender under the wheels of the automobile.

The operation of my improved fender is believed to be apparent. The lower extremity of the fender is arranged forwardly of any portion of the automobile and only a few inches above the ground, whereby the fender will first contact an object in front of the car, and striking it so close to the ground will topple it over onto the netting D of the fender where it will be carried in comparative safety instead of being crushed by the wheels of the machine. The fender is supported in its normal position by springs which are held under tension by the weight of the fender itself and which will tend to cushion the impact of an object falling upon the fender. As soon as the object is lifted from the fender the springs will return it to its normal position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

Having described my invention, I claim:

An automobile fender comprising a frame having a netting mounted thereon, a pair of fulcrum brackets adapted to be secured upon the forward portion of an automobile, removable side arms secured to the frame and adapted to pivot within the fulcrum brackets, supporting springs engaging the frame intermediate its extremities, and guard plates secured to the sides of the frame.

In witness whereof I hereunto set my hand.

JOHN ALLEN.

Witnesses:
　MARY KENNEDY,
　TOM T. THOMAS.